United States Patent [19]

Tong

[11] Patent Number: 5,174,844
[45] Date of Patent: Dec. 29, 1992

[54] METHOD AND MEANS FOR MAKING PULTRUDED FIBER REINFORCED ARTICLES

[75] Inventor: Shan-Nan Tong, Hsin, Taiwan

[73] Assignee: Industrial Technology Research Institute, Hsinchu, Taiwan

[21] Appl. No.: 683,502

[22] Filed: Apr. 5, 1991

Related U.S. Application Data

[63] Continuation of Ser. No. 935,403, Nov. 26, 1983, abandoned.

[51] Int. Cl.⁵ ............................................... B32B 1/00
[52] U.S. Cl. ..................................... 156/180; 156/296
[58] Field of Search ................... 156/180, 296, 244.17; 264/464, 135

[56]  References Cited

U.S. PATENT DOCUMENTS

| | | | |
|---|---|---|---|
| 3,003,189 | 10/1961 | Slayton et al. | 18/30 |
| 3,533,870 | 10/1970 | Mackay et al. | 156/180 |
| 3,793,108 | 2/1974 | Goldsworthy | 156/180 |
| 3,819,442 | 6/1974 | Brushenko | 156/180 |
| 4,394,338 | 7/1983 | Fuwa | 264/46.1 X |
| 4,681,722 | 7/1987 | Carter et al. | 264/171 |

FOREIGN PATENT DOCUMENTS

| | | |
|---|---|---|
| 1539577 | 9/1968 | European Pat. Off. . |
| 1373782 | 11/1974 | European Pat. Off. . |
| 0131484 | 6/1983 | European Pat. Off. . |
| 0206134 | 6/1985 | European Pat. Off. . |
| 0158118 | 10/1985 | European Pat. Off. . |
| 220715 | 5/1985 | Japan . |

Primary Examiner—Frank Spear
Attorney, Agent, or Firm—Darby & Darby

[57]  ABSTRACT

A continuous process for producing pultruded fiber-reinforced articles and the apparatus for such processing. Resin and hardener are continuously mixed and conveyed, out of contact with the atmosphere, into a die in which the mixture contacts reinforcing fibers which are also continuously conveyed into the die. The fibers are impregnated with the mixture and continuously shaped in the die, without contact with the atmosphere.

12 Claims, 2 Drawing Sheets

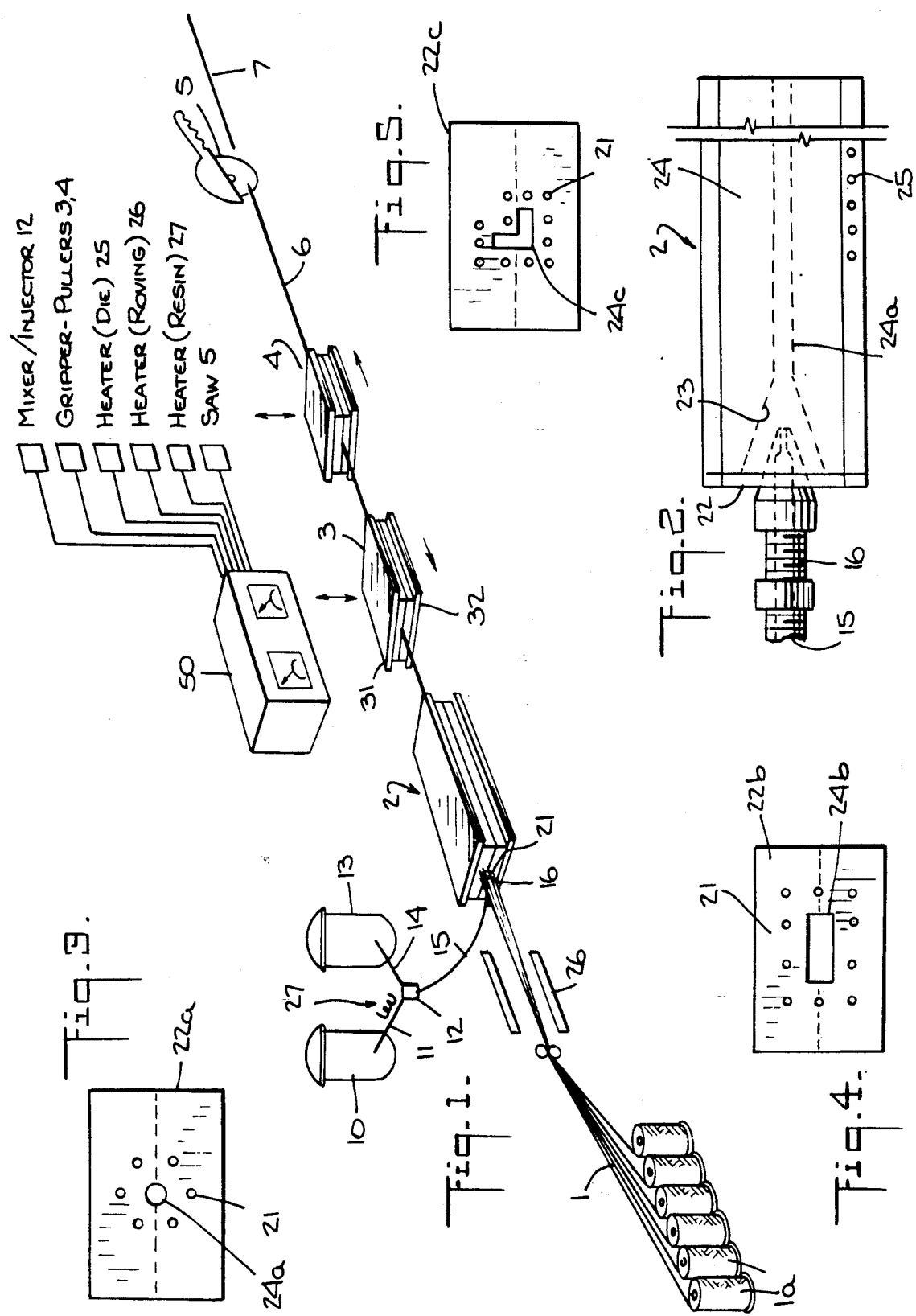

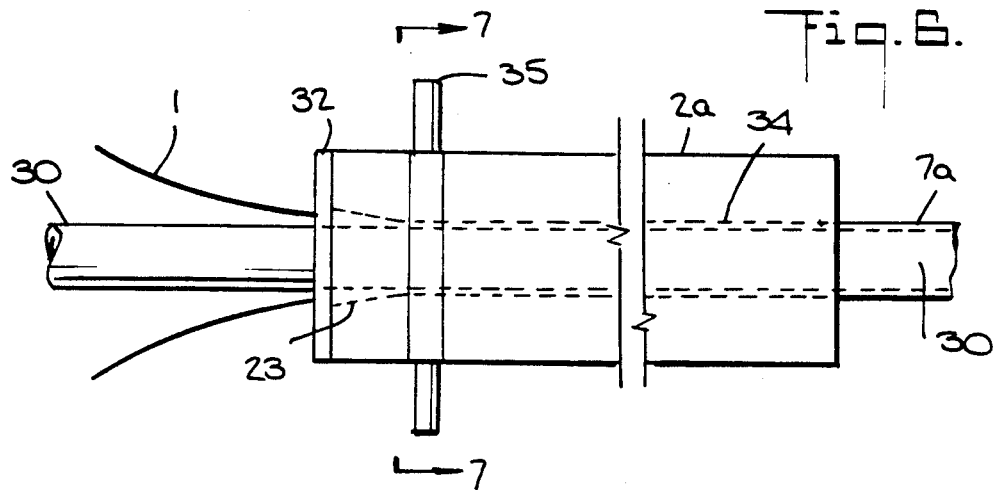
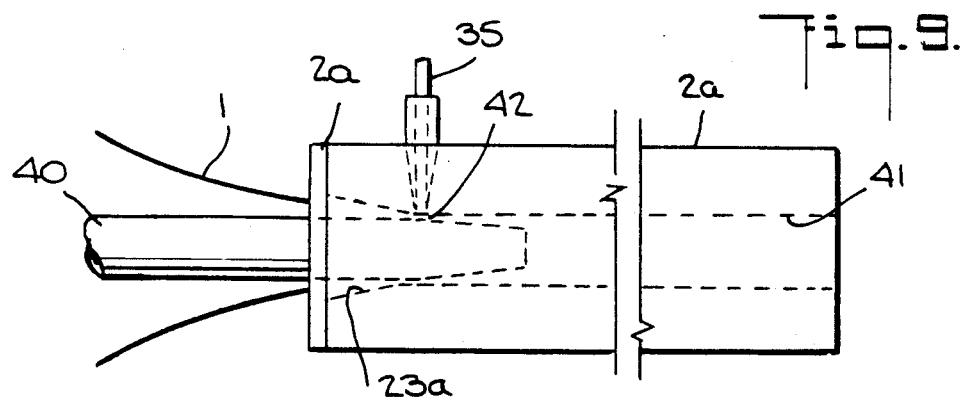
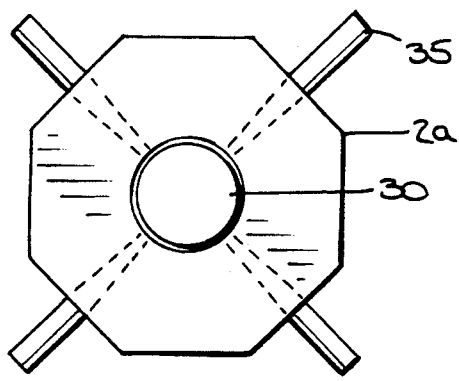
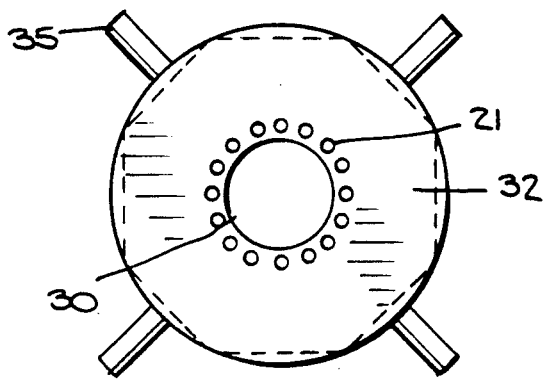

1

METHOD AND MEANS FOR MAKING PULTRUDED FIBER REINFORCED ARTICLES

This is a continuation of application Ser. No. 935,403, filed Nov. 26 1983, now abandoned.

BACKGROUND OF THE INVENTION

This invention relates to a new process and apparatus for producing generally elongated composite articles of fiber-reinforced resins.

More specifically, this invention provides a novel process for continuously producing composite articles of cylindrical shape or other elongated shapes of fiber-reinforced thermosetting resins, which process, unlike the known processes, makes possible the high-speed, high-quality, economical production of such articles.

As a continuous process for producing composite articles of fiber-reinforced thermosetting resins, a so-called pultrusion process has heretofore been proposed. In such a pultrusion process, a fiber-reinforcing material in roving or mat state, or a combination thereof, is impregnated with the thermosetting resin, and the resulting composite is introduced into a heated die for shaping and setting, i.e., curing. The die typically has a passage defining the cross-section or shape of the ultimate product.

Accordingly, the conventional pultrusion processes involve drawing a bundle of filaments from a source thereof; wetting these filaments or reinforced fibers and impregnating them with a preferably thermosettable polymer resin by passing the filaments through a resin bath in an open tank; pulling the resin-wetted and impregnated bundle through a shaping die to align the fiber bundle and to manipulate it to the proper cross-sectional configuration; and curing the resin in a mold while maintaining tension on the filaments. Since the fibers progress completely through the pultrusion process without being cut or chopped, the resulting products have exceptionally high longitudinal strength. They are, therefore, uniquely suited for articles in which high longitudinal strength is required.

The use, in the prior art, of open resin tanks for impregnating the fibers or rovings continuously passing therethrough has the following grave disadvantages 1. In an open tank impregnator, there is the danger that the monomer or highly evaporative content in the resin compound will cause air pollution which, in turn, endangers the health and welfare of the workmen in the plant and can increase the danger of fires, etc.

2. The viscosity of the resin compound in the open resin tank changes with time due to monomer evaporation. This results in an uneven composition of the resin in the tank which, in turn, leads to unstable product quality and consequently a high rate of waste.

3. Mixing of the resin in the open tank with a hardener not only shortens the "shelf life" of the composition but also will cause gelling in the open impregnator tank. The residue which results must be frequently cleaned at substantial labor cost and downtime of the tank.

4. As a result of one or more of the foregoing disadvantages, it will be seen that the proportion of resin to fiber will not be consistent, due to the great difficulty in controlling the viscosity and the composition of the resin mixture in the open impregnation tank.

5. After leaving the open impregnation tank, the array of the fibers is often disordered, and the fibers are often twisted and damaged and their appearance is generally poor.

6. Products produced by conventional pultrusion techniques must frequently be reinforced by use of expensive filament material or fabric because of poor transverse directional performance characteristics.

7. The open tank impregnation method is not suitable for thermoplastic resins, particularly engineering plastic resins with a relatively high melting point.

In order to overcome the above-mentioned shortcomings, a great deal of attention has recently been given to improving the reinforcing materials, resins and hardening agents. For example, in reinforcing materials, quick wetting glass fibers and three-dimensional cross-linking reinforcing materials are now available in the marketplace. As to the hardeners, efforts have been made to accelerate hardening time and prolonging shelf life. Resins now in use have all of the advantages of low shrinkage, fire retardant quality, high temperature resistance, reduction of exotherm cracking and low volatility. Production facilities have been improved so that products of larger size can be produced, particularly by increasing the pull-force.

As far as the pultrusion technology is concerned, a number of new processes have been developed, including systems for permitting a rapid exchange of resin tanks, means for more uniformly heating the mold, systems for controlling more accurately the tension of reinforced fibers, and microcomputer process controls for many of the steps in the process. Unfortunately, all of the foregoing can solve only a portion of the existing problems. The problems created by the use of the open resin impregnating tank have not been solved.

The state of the art in continuous pultrusion processes is generally described in U.S. Pat. No. 4,394,338 to Masaru Fuwa and U.S. Pat. No. 4,445,957 to Dennis L. Harvey. Each of the foregoing patents relates to a continuous pultrusion process in which fiber-reinforcing material is impregnated with a thermosetting resin in an open resin impregnator tank. This traditional pultrusion technology has the shortcomings mentioned above.

In each of the aforesaid patents, the filaments are impregnated with a thermosetting polymer resin by being pulled through an open vessel filled with such resin. Then, the resin-impregnated bundle of filaments is pulled through a shaping die to align the filament bundles and to manipulate them into the proper cross-sectional configuration after which the composite is cured in a mold. It would be preferable in pultrusion processes of the type described in the aforesaid patents (a) to continuously mix specified quantities of resin and catalyst in desired proportion and only just prior to the use of such mixture for impregnation of the filaments, (b) to deliver only such quantities of mixture to the filaments as are required by the pulling rate of the filaments so that just the proper amount of mixture will be available for wetting and no more, and (c) to perform the steps of conveying the resin mixture to the filaments and wetting the latter out of contact with the atmosphere.

Accordingly, it is an object of the present invention to provide a method of forming an article by the pultrusion process which will overcome the disadvantages enumerated above.

Another object of the present invention is to provide a method of forming an article by the pultrusion process in which impregnation of the filaments takes place out of contact with the atmosphere.

A further object of the invention is to provide a method of forming an article by the pultrusion process in which the relative quantities of resin and catalyst can be accurately controlled in relation to the continuous quantities needed for continuous impregnation of the fibers.

Still another object of the invention is to provide a novel die which is capable of simultaneously impregnating and shaping reinforcing filaments to produce a continuous pultruded composite product of constant cross-sectional configuration.

A concomitant object of the invention is to provide a novel apparatus for impregnating and shaping continuous reinforcing fibers while maintaining the resin-impregnating material out of contact with the atmosphere.

BRIEF SUMMARY

These and other objects may be accomplished in a preferred practice of the invention as follows.

Resin and catalyst are supplied to a mixer in a manner to maintain the resin out of contact with the atmosphere. The mixture of resin and catalyst in appropriate proportion is then conveyed, again out of contact with the atmosphere, to an injection nozzle at the upstream end of a die. A plurality of elongated filaments are drawn lengthwise through the die and impregnated therein with the mixture injected through the injection nozzle. The resin-impregnated bundle is drawn lengthwise through a shaping chamber of the die and thence through a heated mold portion of the die for setting the resin/fiber composite in the now shaped form. Pulling and cutting means are provided at the downstream end of the die for continuously pulling the composite pultruded product from the die and for cutting the latter into articles of predetermined length. The mixing, injecting and drawing steps are accurately controlled with respect to each other so that the mixture of resin and catalyst will contain the proper proportion of each and the quantity of the mixture conveyed to the die will be coordinated with the speed at which the composite product is withdrawn from the die.

Preferably, the die has a distributor plate at the upstream axial end thereof. An injection nozzle is preferably centrally located with respect to the distributor plate and extends therethrough into the interior of the shaping chamber of the die for delivering the resin mixture thereto. A plurality of additional orifices are formed in the distributor plate surrounding the injection nozzle and the filaments are drawn through the various orifices and lengthwise through the remaining portion of the die.

BRIEF DESCRIPTION OF THE DRAWINGS

Embodiments in accordance with the present invention will now be described, by way of example only, with reference to the accompanying drawings in which:

FIG. 1 is a diagrammatic perspective view showing an apparatus for the practice of one example of the process of this invention;

FIG. 2 is a side view, in longitudinal section, of the essential parts of the die according to this invention;

FIG. 3 is a diagrammatic front elevational view of the die according to a preferred embodiment of this invention.

FIG. 4 is a diagrammatic front elevational view of the die according to another preferred embodiment of this invention for making an elongated article having a rectangular transverse cross-sectional shape;

FIG. 5 is a diagrammatic front elevational view showing still another preferred embodiment of a die according to this invention for making an elongated article having an L-shaped transverse cross-section;

FIG. 6 is a diagrammatic side elevational view of an apparatus for the practice of another example of the process of the invention;

FIG. 7 is a transverse cross-sectional view taken along arrows 7—7 of FIG. 6 showing a plurality of injection nozzles distributed around the body of the die;

FIG. 8 is a front elevational view of the distribution plate of the die shown in FIG. 6; and FIG. 9 is a diagrammatic side elevational view of a die according to another preferred embodiment of the invention.

DETAILED DESCRIPTION OF THE INVENTION

Referring first to FIG. 1, continuous-length reinforcing fibers, rovings or filaments 1 are conducted from a plurality of spools 1a into a heated di 2. The fibers 1 pass through orifices 21 (FIG. 3) in a guide/distribution plate 22 which forms the upstream axial end of the die 2. Upon entering the die 2, through the orifices 21, the filaments pass through shaping chamber 23 and then, in lengthwise direction, through the cavity 24a in mold portion 24, toward the downstream end of the die.

The reinforcing filaments 1 are pulled from the downstream end of die 2 by a pair of reciprocating gripper-pullers 3 and 4, each of which sequentially opens to let filament pass through (as a result of pulling by the other gripper-puller), moves a predetermined distance in a direction toward the die, with the jaws 31, 32 open, closes to grasp the filament between the jaws 31 and 32 thereof, and then moves the same distance in a direction away from the die 2 (with the jaws closed) to pull the finished composite product 6 out of the die. As a result of several reciprocating gripper-pullers operating in sequence, a substantially continuous drawing of the filaments 1 through the die 2 may be accomplished.

Downstream of the gripper-pullers 3, 4 is a cutting station including an automatic saw 5 for sequentially cutting predetermined lengths 7 from the strip of product 6 withdrawn from the die 2.

A resin, preferably a thermosetting resin such as unsaturated polyester resin, epoxy resin or polyamide resin, stored in a closed vessel 10 is conveyed through a closed conduit 11 to a mixer unit 12 where it is mixed with catalyst (and/or filler) preferably stored in a closed vessel 13 and conveyed to the mixer 12 through a conduit 14. After being mixed in the appropriate proportions, the mixture of resin and catalyst is fed through a conduit 15 to an injector nozzle 16. Injector nozzle 16 extends through the distributor/guide plate 22 into the interior of shaping chamber 23 of die 2 (see FIG. 2).

According to the preferred process of the invention, the rovings or filaments 1 for reinforcement may be continuous roving, tape, or fabric, of fiberglass, carbon fiber, kevlar or a hybrid of these, and are conducted through the orifices 21 into the shaping chamber 23 where they are impregnated by the resin/catalyst mixture injected by injector 16. The reinforcing fiber material, thus impregnated, is simultaneously shaped, as it passes through shaping chamber 23, to substantially the transverse cross-sectional shape of the desired finished product.

As seen in FIGS. 1 and 2, injection nozzle 16 is preferably centrally located with respect to the distributor plate 22 and the tip of the injector nozzle 16 extends into the shaping chamber 23 so that the injected resin material will be injected into direct contact with the filaments 1 entering shaping chamber 23 through the respective orifices 21, for radially outward flow impregnating of the surrounding filaments 1 by the resin material, and such that the radially outward flow of the resin material serves automatically to exclude air, existing at the upstream end of die 2, from shaping chamber 23. As best seen in FIGS. 3, 4 and 5, the transverse outline configuration of the cavity of mold 24 can be varied depending on the outline configuration desired for the ultimate product, whereas the size, i.e. diameter, is shown to be constant and uniform throughout. Thus, for example, if a rod-shaped (i.e., solid cylindrical) pultruded product is desired, the mold cavity shape 24a, indicated in FIG. 3, is generally circular in shape, with the orifices 21 distributed along a circle coaxial with the cylindrical mold cavity. FIG. 4 shows the configuration of the array of orifices 21 for use with a mold cavity configuration 24b for producing an elongated pultruded article having a transverse cross-sectional configuration which is substantially rectangular in shape.

FIG. 5, on the other hand, illustrates a preferred array for the orifices 21 in the case of a mold cavity for forming an L-shaped cross-sectional pultruded article.

The mold portion 24 of the die 2 is preferably heated so that the resin mixture/roving composite will set while it is passing therethrough. This may be accomplished by heating element 25 embedded in the mold portion 24.

Reinforcing fibers or rovings 1 from the spools 1a are preferably preheated by heater 26 before entering the die 2 through a predetermined array of openings 21.

The resin and the catalyst or hardener are fed into the mixer 12 at a fixed predetermined ratio. The resin/catalyst mixture is then fed directly to the front section of the die 2 through injector 16 which discharges the required amount of mixed resin at the identical rate at which the mixing takes place. Upon being discharged into the upstream shaping cavity 23 of the die, the resin/hardener mixture immediately impregnates the fibers 1 which are being drawn through the die 2 at a given predetermined speed by the reciprocating gripper/pullers 3 and 4, or by any similar pulling device, for example a pair of opposed endless belts.

It will be seen that according to this process the resin is not exposed to the atmosphere. It is stored in a closed resin supply vessel 10, conveyed through a closed conduit 11 to the mixer 12, and then fed through the conduit 15 directly to the injector 16 and thence into the interior of impregnating/shaping cavity 23 where it immediately impregnates the fibers or filaments 1. Accordingly, the process is free from such disadvantageous results as monomer evaporation, change of viscosity or uneven composition of materials. Furthermore, since the resin mixture is pumped into the impregnating chamber 23 at the rate required for impregnating the fibers 1 feeding through that chamber and is being mixed with catalyst at the same rate in the mixer, there will not be any unused resin capable of mixing with catalyst which can result in forming residue. According to this process, therefore, the resin/catalyst mixture and the fibers are each fed in the required ratio and impregnated entirely within the confines of the die 2 to allow uniformity, stability and homogeneous composition.

The distributor plate 22, with the orifices 21 therethrough arranged in the preferred array for the article to be produced, forces the fibers to array as required for maximum quality and appearance of the final pultruded product 7.

Since the resin and the catalyst are fed into the mixer 12 through separate conduits 11 and 14, respectively, the resin in conduit 11 may be preheated by a heater 27, to reduce its viscosity and thereby to speed the impregnation process and consequently the productivity output, without affecting the shelf time of the remaining quantities of resin.

Preheating of the fibers 1 before they are fed into the die 2 may be accomplished by a heater 26 and not only results in reducing the time required for impregnating the fibers with the resin mixture, but will also decrease the water content of the fibers, resulting in improved quality of the final product. The disadvantageous results of non-homogeneous quality and low production speed in the prior art processes are therefore overcome.

The process according to the present invention is useful also with thermoplastic resins. Since the resin injector is positioned to discharge material inside the die, melted thermoplastic resin may be extruded directly through the injector into the interior of the die. This contrasts with the traditional process where expensive powdered plastic pellets are required to avoid solidification before the thermoplastic resin is introduced into the die. In addition to the benefit of energy saving, low production costs and ease of processing, the products may be varied by adding resin through additional openings in the body of the die. Thus, according to the process and apparatus illustrated in FIGS. 6, 7, 8 and 9, the composition of the resin forming the core of the finished product may be the same as or different from the composition of the resin forming an outer cover of the finished product, in the event a product having a core and a different outer cover should be desired. Thus, sandwich-type or layered products may be produced. Also, if the process according to the present invention is combined, as shown for example in FIGS. 6, 7 and 8, with a conventional process of extrusion, the extruded product 30 from the extrusion machine may be introduced directly into a central opening in distribution plate 32 of the die 2a of the pultrusion machine as seen in FIG. 6 instead of where the opening in injection nozzle 16 would otherwise be located. The resin mixture for forming, together with the fiber 1, an outer layer around core 30 is introduced into the die 2 through a plurality of injection nozzles 35. This permits the manufacture of a pultruded product 7a with an extruded central core 30. The central core may be square, round or other shape and may be hollow or solid to permit a variety of designs and structures.

If a central core member such as core part 40 illustrated in FIG. 9 is made a part of the die 2a and extends into the die 2a as shown in FIG. 9, a continuous tube or sleeve-shaped hollow pultruded product may be formed, including products reinforced in different directions, as described below. The sleeve may contain different kinds of fibers or its hybrids. The shaping orifice in this case would preferably be of annular shape (if a round tubular product were desired) and would be formed between the periphery of the central core 40 and the wall of the mold cavity 41. The fibers are arrayed to pass through this annular opening 42 and preferably a plurality of resin injectors 35 are distributed around the periphery of the die 2a as seen, for example, in FIG. 9. The shaping and resin impregnation of the fibers takes place in this annular chamber 42 and the composite tube-shaped product (not shown) then passes through the heated mold portion 41 of the die 2a for hardening.

According to the embodiment illustrated in FIG. 6, the resin and hardener mixture is fed to and immediately extruded into the die by injectors 35 distributed around the upstream portion of the die 2a. Reinforcing fibers 1 are guided into the die through the holes on the distributor plate. If, instead of a rod 30 of extruded plastic material, a rigid hollow tube (not shown) of knitted fiber is fed into the die through the central opening in the distributior plate, the fibers 1 will form around the hollow tube in the cavity and will be wetted and impregnated by the resin mixture extruded from the injectors 35. Upon passing through the heated mold portion 34, multidirectionally reinforced pultruded product is formed and is cut to the required length by shearing equipment.

The various operating steps of the process are accurately controlled by control means 50, well-known to those skilled in the art, which may be readily adapted for the purpose. The control means 50 controls the operation of the mixer 12 (including the speed of the mixer as well as the proportions of resin and catalyst which are mixed), determining also the rate and volume of the resin mixture injector by injetor nozzle 16, the temperature at which the various heaters, namely heater 25, heater 26 and heater 27, operate, the operation of the reciprocating gripper/pullers 3 and 4 (to control the rate at which composite product 6 is withdrawn from the die 2) and thus the rate at which the fibers 1 are drawn through the die 2, and the intervals at which the shearing apparatus 5 cuts the composite 6 into individual articles 7.

While the invention has been described in terms of specific embodiments thereof, other forms will be readily adapted by one skilled in the art. Accordingly, the subject invention is to be limited only per the following claims.

What is claimed is:

1. A pultrusion process for producing composite articles which include a substantially airtight die having an inlet portion, an upstream zone, and a downstream shaping zone, comprising:
   conveying a thermosetting resin and a hardener in predetermined proportions into a mixing zone and mixing the same, out of contact with ambient air, therein;
   continuously conveying said resin mixture, out of contact with ambient air, to said inlet portion;
   continuously feeding a plurality of reinforcing fibers into said inlet portion in an array corresponding in shape generally to the periphery of a transverse cross-section of the composite article, said die being disposed axially to the direction of feed of the array of said fibers;
   controlling the rate of feed of said resin mixture into said die in relation to the rate of feed of the plurality of fibers;
   continuously impregnating the fibers with the resin mixture in said upstream zone;
   continuously shaping the impregnated fibers within said shaping zone into a cross-sectional shape corresponding to the cross-sectional shape of the composite article; and
   pulling the fibers lengthwise from said die to form the composite article.

2. The pultrusion process of claim 1 wherein said resin and hardener are continuously fed to the mixer.

3. The pultrusion process of claim 1 wherein individual fibers from the said plurality of fibers are fed into individual openings in the axial end of a plate in said upstream portion of the die, said openings forming an array resembling generally the periphery of the transverse cross-section of the composite article.

4. The pultrusion process of claim 1 wherein the fibers are simultaneously impregnated and shaped in the shaping zone.

5. A pultrusion apparatus for producing an elongated composite article comprising: a mixing zone for continuously mixing a thermosetting resin and a hardener in predetermined portions to form a resin mixture; conduit means connecting said mixing zone to the inlet of a die, said die having a transverse cross-section corresponding essentially to the cross-section of the elongated composite article; control means for controlling the rate of feed in said resin mixture to said die in proportion to the rate of feed of fibers to said die; a first zone within said die for continuously impregnating said fibers with said resin mixture; a second zone for continuing said impregnation and for shaping the impregnated fibers from the first zone into the transverse cross-sectional shape of the composite article; means for maintaining said resin mixture in said mixing zone, conduit, and die out of contact with the atmosphere; and pulling means downstream of said die for pulling the shaped continuously material out from said die.

6. The pultrusion apparatus of claim 5 wherein the inlet portion of said die comprises a distributor plate having orifices therethrough, at least one of said orifices being for the introduction of said resin mixture and a plurality of said orifices being for the introduction of said fibers.

7. The pultrusion apparatus of claim 6 wherein the conduit means includes an injector in the inlet of said die for feeding said resin mixture into at least one of said orifices for injecting said resin mixture into contact with said fibers and the interior of said die.

8. The pultrusion apparatus of claim 7 wherein said injector is positioned to inject the resin mixture into said die in a generally axial direction.

9. The pultrusion apparatus of claim 7 wherein said injector is positioned to inject the resin mixture into the die in a generally radial direction.

10. The pultrusion apparatus of claim 6 wherein said distributor plate contains a centrally positioned orifice communicating with an injector and wherein the plurality of orifices form an array around said injector means, which array has a shape which corresponds to the periphery of the transverse cross-section of the composite article.

11. The pultrusion apparatus of claim 5 wherein a heating means is provided for preheating the fibers prior to their introduction into said die and during said impregnation.

12. The pultrusion apparatus of claim 5 wherein heating means are provided to preheat the resin prior to entering the mixing zone.

* * * * *